United States Patent [19]
Yang

[11] Patent Number: 5,833,543
[45] Date of Patent: Nov. 10, 1998

[54] APPARATUS FOR FORMING A SLOT IN A HEADLESS SCREW

[75] Inventor: Wen-Reuy Yang, Kaohsiung Hsien, Taiwan

[73] Assignee: Ming Liau Co., Ltd., Kaohsiung Hsien, Taiwan

[21] Appl. No.: 820,778

[22] Filed: Mar. 18, 1997

[51] Int. Cl.$^6$ ....................................................... B21H 3/02
[52] U.S. Cl. .............................. 470/60; 470/62; 470/164; 470/179; 470/904
[58] Field of Search .................................. 470/57, 58, 60, 470/61, 62, 63, 164, 176, 177, 179, 904; 72/419, 422, 423; 269/254 R, 57

[56] References Cited

U.S. PATENT DOCUMENTS

| | | | |
|---|---|---|---|
| 2,746,065 | 5/1956 | Poupitch | 470/2 |
| 2,980,928 | 4/1961 | Wallace et al. | 470/58 |
| 3,222,702 | 12/1965 | Lofgren et al. | 470/177 |
| 3,760,443 | 9/1973 | Jackson | 470/62 |
| 4,030,153 | 6/1977 | Shemtov | 470/177 |

FOREIGN PATENT DOCUMENTS

| | | | |
|---|---|---|---|
| 2056890 | 3/1981 | United Kingdom | 470/58 |

*Primary Examiner*—Joseph J. Hail, III
*Assistant Examiner*—Ed Tolan
*Attorney, Agent, or Firm*—Merchant, Gould, Smith, Edell, Welter & Schmidt

[57] ABSTRACT

An apparatus for forming slots in headless screws includes a rotatable disc holding, along its circumferential end, a plurality of clamps which extend radially and are spaced apart circumferentially and which respectively have radial screw receiving spaces opening at the circumferential end, a feeding member provided above the rotatable disc to drop screws into the screw receiving spaces successively, a rotary cutter unit provided downstream of the feeding member for successively cutting the ends of the screws exposed from the screw receiving spaces, and a press member provided adjacent to the rotary cutter unit for successively pressing the clamps to their clamping positions. Each clamp has first and second components which include connecting parts interconnected to one another and clamping parts having cavities that complement one another to form the screw receiving space. The clamping part of the second component is bendable towards the clamping part of the first component when pressed by the press member.

9 Claims, 5 Drawing Sheets

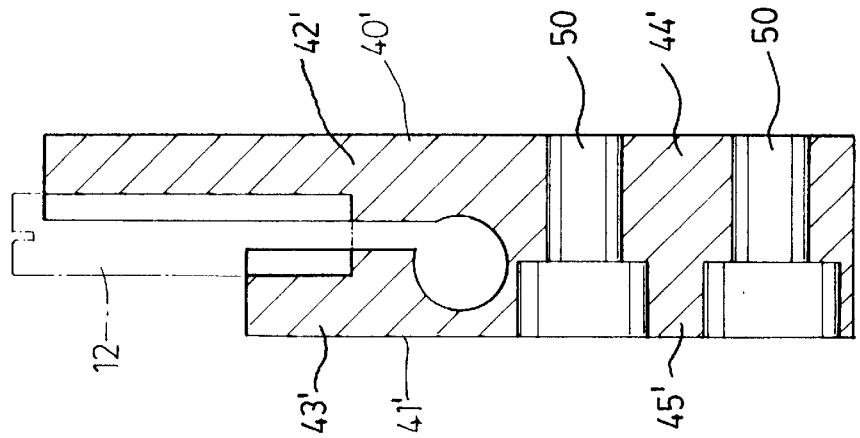
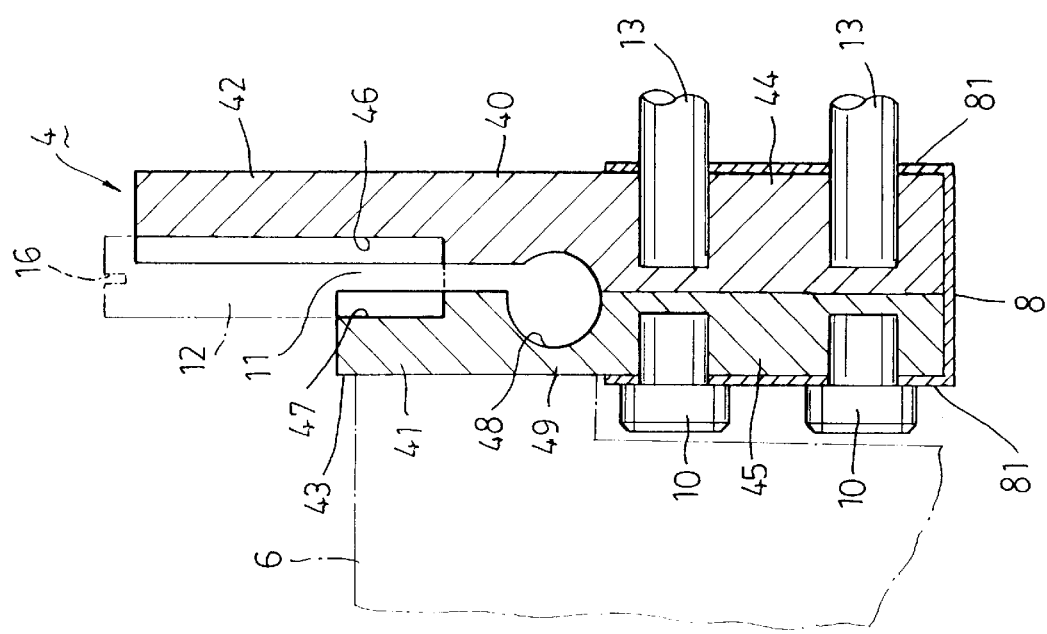

APPARATUS FOR FORMING A SLOT IN A HEADLESS SCREW

BACKGROUND OF THE INVENTION

1. Field of the Invention

This invention relates to an apparatus for making a headless screw, more particularly, to an apparatus for forming a slot in a headless screw to engage a tool such as a screw driver.

2. Brief Description of the Prior art

As shown in FIG. 1, headless screws are fabricated conventionally by first cutting blanks 82 from an elongated rod 80 and then forming a slot 84 in each blank, followed by formation of a screw thread 86 on the slotted blank. A problem encountered with this fabrication method is that the slot 84 tends to deform in a manner as shown by the dotted line due to the pressure induced by the thread forming apparatus during formation of the screw thread 86, thus failing to achieve the predetermined dimension.

To alleviate the problem of the above-mentioned fabricating method, some manufacturers have developed a method in which slots are formed in screws after formation of the screw threads. Specifically, as shown in FIG. 2, this method comprises the step of forming a screw thread on an elongated blank 90 which is held in place by a clamp 92 having upper and lower clamp parts 920 and 922. The threaded elongated rod is cut into headless screws having a predetermined length with a cutter 94, and a slot 900 is formed at the end of the threaded elongated rod before each cutting operation of the elongated rod. As such, a predetermined amount of headless screws with slots can be formed from a blank. Although this method has solved the problem of slot deformation, it suffers from the following drawbacks:

1. In this method, the length of each blank is determined according to the total length of the screws to be cut therefrom. Since the cutter 94 has a thickness and since dimensional loss can occur due to the thickness of the cutter, each blank should be provided with an extra length to compensate for dimensional loss, thereby resulting in inconveniences and in an increase in the material cost.

2. If the blank is made of stainless steel, because brow formation can occur about the slot after the slot is cut, an additional trimming step is necessary to remove the brow formation. Although a quick cut steel may be used to solve the problem of brow formation, it can increase the cost considerably.

3. The clamp 92 holds one end of the threaded blank through the upper flat clamp part 920 and the lower wedge-shaped concaved clamp part 922 which contact the threaded blank at three clamping points. Since the clamping forces are exerted at the clamping points, the thread formed on the blank can be impaired due to stress concentration, thus resulting in a substantial amount of defective products.

SUMMARY OF THE INVENTION

An object of the invention is to provide an apparatus for forming a slot in a headless screw, whereby the slot of the headless screw can be formed after forming the thread thereof, without deforming or damaging the threads of the screw.

Another object of the invention is to provide a clamp for firmly holding a headless screw without deforming or damaging the threads of the screw.

Accordingly, in one aspect of the invention, an apparatus for forming slots at the ends of headless screws comprises:

a rotatable disc having a horizontal shaft and a circumferential end;

a plurality of clamps which are mounted on the rotatable disc and which extend radially and which are spaced apart circumferentially along the circumferential end, each of the clamps including a first component and a second component having clamping parts adjacent to the circumferential end and connecting parts inwardly of the clamping parts, the clamping parts being normally spaced apart from each other while the connecting parts being connected to one another, the first and second components being aligned in an axial direction of the rotatable disc and provided with cavities in the clamping parts for complementing one another to form a screw receiving space which is open substantially at the circumferential end for exposing one end of the headless screw, the second component having a resiliently bendable part between the clamping part and the connecting part thereof for permitting the clamping part of the second component to bend toward the first component, each of the cavities having a segment-shaped cross-section and an arched clamp face for contacting the headless screw when the clamping part of the second component moves toward the first component to be in a clamping position;

a feeding member provided above the circumferential end for dropping the headless screws into the screw receiving spaces one after the other;

a rotary cutter unit rotatable about an axis parallel to the shaft of the rotatable disc and provided adjacent to the circumferential end, the rotary cutter being located downstream of the feeding member so as to cut successively the ends of the headless screws which are exposed from the screw receiving spaces of the clamps, respectively; and a press member provided adjacent to the rotary cutter unit for pressing the clamping part of the second component of each of the clamps to the clamping position to grip the headless screw which is being cut by the rotary cutter unit.

In another aspect of the invention, a device for clamping a headless screw comprises a clamp which includes a first component and a second component having connecting parts interconnected to one another, the clamp further having clamping parts which are spaced apart from each other and which have respective cavities for complementing one another to form a screw receiving space, the screw receiving space being opened at one end thereof for exposing one end of the headless screw, the second component further having a resiliently bendable part between the clamping part and the connecting part thereof for bending toward the first component. Each of the cavities has a segment-shaped cross-section and an arched clamp face, the arched clamp face having an arched contact area for contacting the headless screw when the clamping part of the second component moves toward the first component to be in a clamping position.

The present exemplary preferred embodiments of the invention will be described with reference to the accompanying drawings.

BRIEF DESCRIPTION OF THE DRAWINGS

FIG. 6 is an example of the clamp of the apparatus in the present invention; and FIG. 7 is another example of the clamp of the apparatus in the present invention.

DETAILED DESCRIPTION OF THE PREFERRED EMBODIMENT

Figure 1:
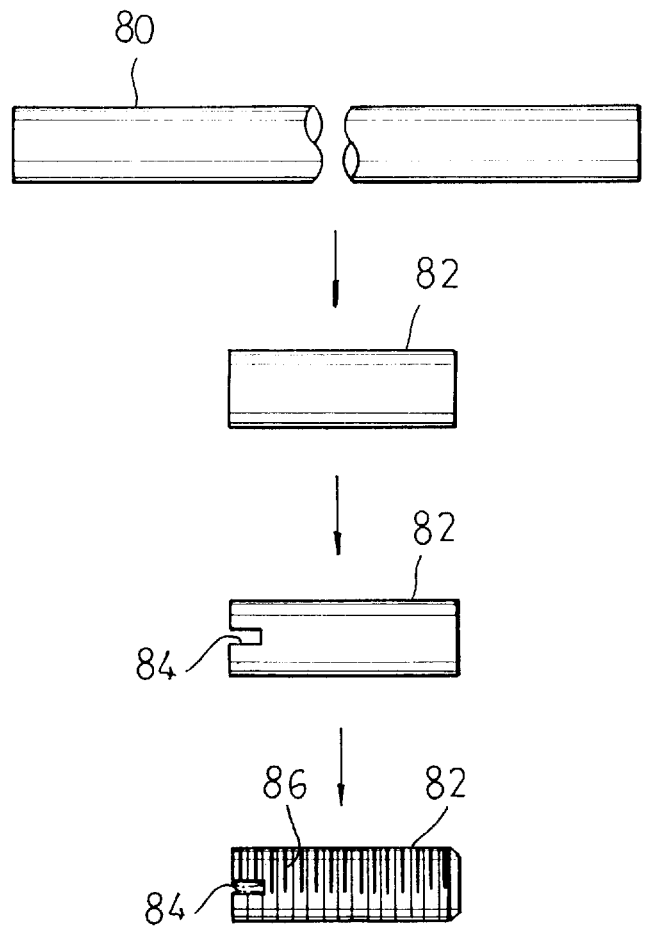
FIG. 1 illustrates a conventional method for forming a headless screw.
Figure 2:
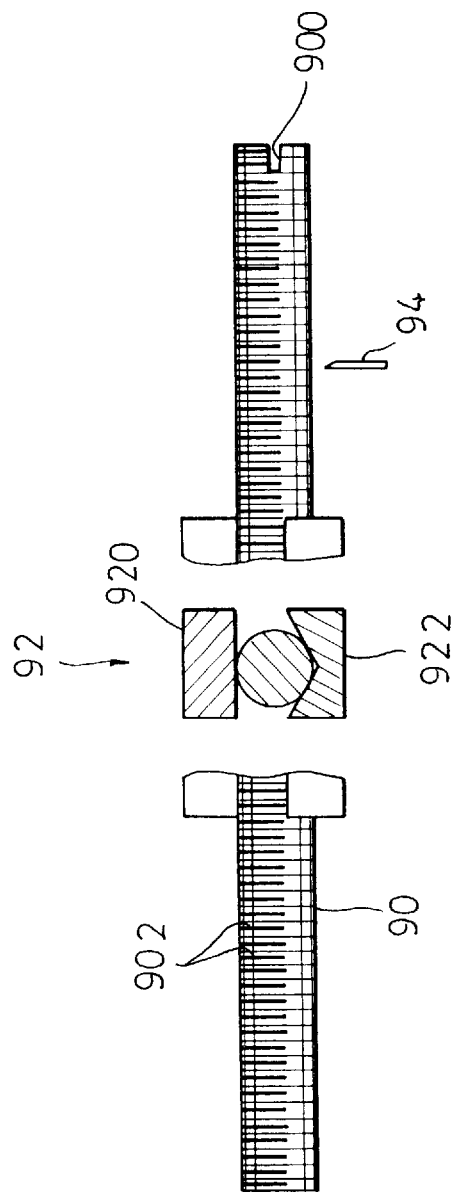
FIG. 2 illustrates another conventional method for forming a headless screw.

As shown in FIGS. 3 to 6, a preferred embodiment of an apparatus for forming slots in headless screws according to the present invention includes a rotatable disc 2 having a horizontal shaft 3, a feeding member 5 provided above the rotatable disc 2 for feeding threaded rods or headless screws 12, a press member 6 provided at one side of the rotatable disc 2, and a rotary cutter unit 7 provided adjacent to a circumferential end of the rotatable disc 2 and the press member 6.

The rotatable disc 2 has a plurality of clamps 4, along its circumferential end, which extend radially and spaced apart circumferentially. Each clamp 4 includes a first component 40 and a second component 41 which are separate pieces and which have clamping parts 42, 43 adjacent to the circumferential end of the rotatable disc 2, and connecting parts 44, 45 inwardly of the clamping parts 42, 43. The clamping parts 42, 43 are normally spaced apart from each other while the connecting parts 44 and 45 abut against one another. The first and second components 40, 41 are aligned in an axial direction of the rotatable disc 2 and are provided with cavities 46, 47 in the clamping parts 42, 43 for complementing one another to form a screw receiving space 11 which is open substantially at the circumferential end for exposing the end of a headless screw received therein. Each cavity 46 or 47 has a segment-shaped cross-section and an arched clamp face for contacting the headless screw when the clamping part 47 of the second component 41 moves toward the first component 40 to be in a clamping position.

The second component 41 has a resiliently bendable part 49 between the clamping part 43 and the connecting part 45 thereof for permitting the clamping part 43 to bend toward the clamping part 42 of the first component 40. The resiliently bendable part 49 is formed by providing a recess 48 so that the thickness of the resiliently bendable part 49 is reduced as compared to the clamping part 43 and the connecting part 45, and can be flexed toward the first component 40. The connecting parts 44, 45 are held together by means of a U-shaped holding plate 8 having two arm portions 81 which sandwich the connecting parts 44, 45. One of the arm portions 81 and the connecting part 44 of the first component 40 are fastened to the rotatable disc 2 by bolts 13, while the other arm portion 81 and the connecting part 45 of the second component 41 are fastened together via bolts 10. Since the bolts 10 do not penetrate into the connecting part 44 and since the connecting parts 44, 45 are respectively connected to the arm portions 81 of the U-shaped holding plate 8, the connection between the connecting parts 44, 45 of the first and second components 40, 41 has a measure of resiliency.

For easy access to the screw receiving space 11 of each clamp 4, the clamping part 43 of the second component 41 is arranged to be shorter than the clamping part 42 of the first component 40 so that the outer end of the second component 41 terminates inwardly of the outer end of the first component 40.

The feeding member 5 is provided above the circumferential end of the rotatable disc 2 to feed headless screws 12 successively into the screw receiving spaces 11 of the clamps 4 by virtue of gravity.

Figure 3:
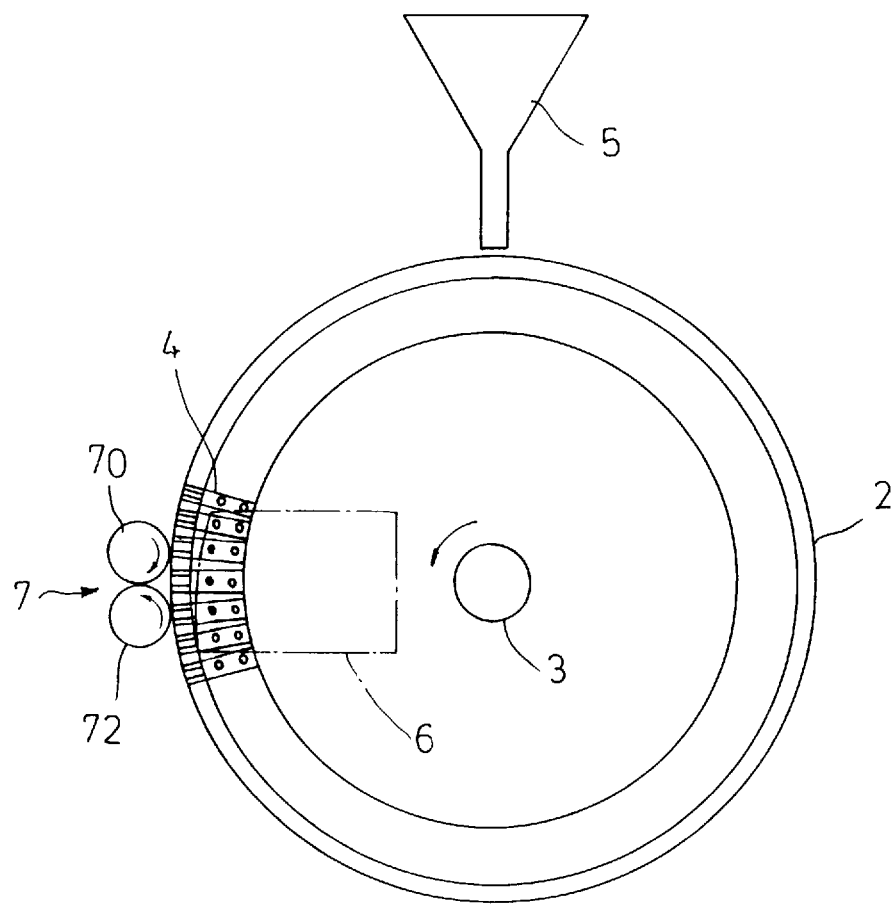
FIG. 3 shows a side elevation view of an apparatus for forming a slot in a headless screw according to the present invention.
Figure 4:
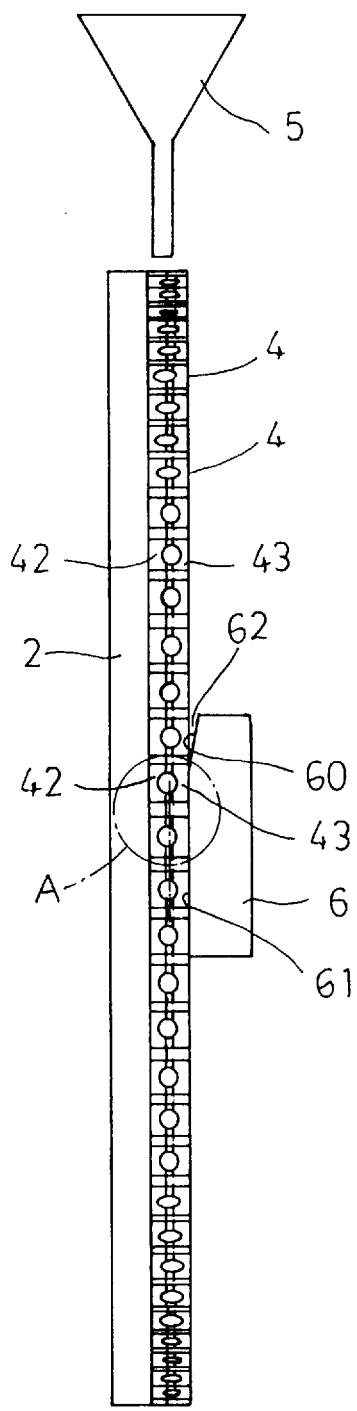
FIG. 4 shows a front elevation view the apparatus of FIG. 3.
Figure 5:
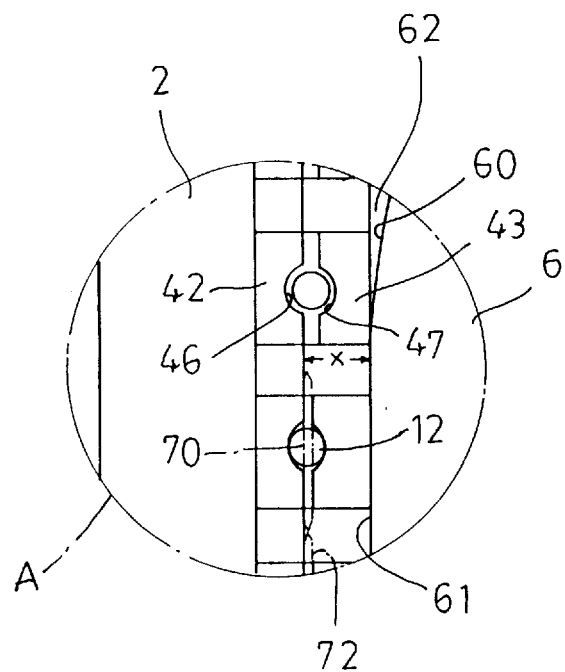
FIG. 5 is an enlarged view of a portion of the apparatus shown in FIG. 4.

As best shown in FIG. 3, the rotary cutter unit 7 is provided adjacent to the press member 6 and the circumferential end of the rotatable disc 2 at the downstream side of the feeding member 5 relative to the forward direction of the rotatable disc 2. The rotary cutter unit 7 includes a pair of rotary cutters 70 and 72 which rotate in opposite directions about axes parallel to the shaft 3 of the rotatable disc 2. The rotary cutter 72 is provided downstream of the rotary cutter 70. The rotary cutter 70 commences the cutting of a slot 16 (shown in FIG. 6) in an end of each headless screw, which is exposed from the respective screw receiving space, from an upstream side of the slot 16 and terminates the cutting midway of the slot 16. Subsequently, the rotary cutter 72 commences the cutting of the slot 16 from a downstream side of the slot 16 and terminates the cutting midway of the slot 16 so as to complete formation of the slot 16.

The press member 6 is provided at one side of the rotatable disc 2 for successively pressing the clamping parts 43 of the second components 41 of the clamps 4 toward the clamping parts 42 of the first components 40 respectively. The press member 6 is axially spaced apart from the plane of each clamping part 42 to define a clamping space (X) with each clamping part 42. During rotation of the rotatable disc 2, each clamping part 43 passes through the clamping space (X) so that it is bent toward the respective clamping part 42. Particularly, the press member 6 includes a flat press face 61 to define the clamping space (X) and an inclined face 60 upstream of the flat press face 62. The inclined face 60 forms a guide passage 62 which tapers toward the clamping space (X) for guiding access of the clamping part 43 into the clamping space (X).

In operation, the feeding member 5 drops headless screws 12, which have been formed with screw threads, into the screw receiving spaces 11 of the clamps 4 one after the other, while a drive means (not shown) drives the shaft 3 to rotate the rotatable disc 2 counterclockwise. The cross-section of the screw receiving spaces of the clamps 4 is greater than that of the headless screws before the clamps 4 reach the press member 6. When the clamps 4 with the headless screws 12 pass through the rotary cutter unit 7 and the press member 6, the clamping part 43 of each clamp 4 is bent toward the respective clamping part 41 so that the arched clamp faces of each clamp 4 abut against the peripheral surface of each headless screw 12, and the rotary cutters 70, 72 cut the exposed end of each headless screw 12. After the headless screws 12 are slotted and moved away from the press member 6, the headless screws 12 are released from the respective clamps 4 by virtue of gravity, and the slotted headless screws are collected below the rotatable disc 2.

FIG. 7 shows an alternative construction of the clamp of the present invention in which first and second components 40' and 41' are formed into one piece so that the connecting parts 44' and 45' thereof have a unitary integral construction without any fasteners. The clamping parts 42' and 43' are spaced apart from each other. Holes 50 are provided in the connecting parts 44' and 45' to receive fasteners (not shown) for attaching the clamp to the rotatable disc 2.

With the apparatus of the present invention, headless screws can be slotted after formation of screw threads so that the problem of slot deformation encountered in the conventional headless screw fabricating method is eliminated. Besides, the apparatus minimizes the problem of impairing or damaging the screw thread during the slot cutting process because the stress concentration problem of the conventionally used clamp for screws can be alleviated by the use of the clamps 4 which have arched contact areas to contact the threads of the headless screws. In addition, with the apparatus of this invention, the slot can be formed directly in each pre-dimensioned headless screw so that no material is wasted. Moreover, no brow formation occurs in cutting the slot with the present invention because two rotary cutters 70 and 72 which rotate in opposite directions are used to cut the same slot in each headless screw. Generally, brows are formed where a cutter exits the cut formed thereby. In the present invention, the cutter 70 commences its cutting from an upstream side and exits the cut slot at the midway of the slot, while the downstream cutter 72 commences its cutting from a downward side-and exits the cut slot from a location where the cutter 70 leaves the slot. The downstream cutter 72 which rotates in the opposite direction can cut out the brows formed by the upstream cutter 70.

With the invention thus explained, it is apparent that various modifications and variations can be made without departing from the spirit of the invention. It is therefore intended the invention be limited only as indicated in the appended claims.

What I claim is:

1. An apparatus for forming slots in headless screws comprising:

a rotatable disc having a horizontal shaft and a circumferential end;

a plurality of clamps which are mounted on the rotatable disc and which extend radially and are spaced apart circumferentially along said circumferential end, each of said clamps including a first component and a second component having clamping parts adjacent to said circumferential end and connecting parts inwardly of said clamping parts, said clamping parts being normally spaced apart from each other and said connecting parts being connected to one another, said first and second components being aligned in an axial direction of said rotatable disc and provided with cavities in said clamping parts for complementing one another to form a screw receiving space which is open substantially at said circumferential end for exposing one end of said headless screw, said second component having a resiliently bendable part between said clamping part and said connecting part thereof for permitting said clamping part of said second component to bend toward said first component, each of said cavities having a segment-shaped cross-section and an arched clamp face for contacting said headless screw when said clamping part of said second component moves toward said first component to be in a clamping position;

a feeding member provided above said circumferential end for dropping said headless screws into said screw receiving spaces one after the other;

a rotary cutter unit rotatable about an axis parallel to said shaft of said rotatable disc and provided adjacent to said circumferential end, said rotary cutter being located downstream of said feeding member so as to cut successively the ends of said headless screws which are exposed from said screw receiving spaces of said clamps, respectively; and a press member provided adjacent to said rotary cutter unit for pressing said clamping part of said second component of each of said clamps to the clamping position to grip said headless screw which is being cut by said rotary cutter unit.

2. An apparatus as claimed in claim 1, wherein said second component of each of said clamps is recessed to reduce the thickness thereof in said resiliently bendable part to provide resiliency.

3. An apparatus as claimed in claim 1, wherein said press member is axially spaced apart from the plane of said clamping part of said first component of each of said clamps pressed thereby, so as to confine a clamping space with said clamping part of said first component, said clamping part of said second component being bent towards said clamping part of said first component when received in said clamping space.

4. An apparatus as claimed in claim 3, wherein said press member includes a flat press face to confine said clamping space and an inclined face upstream of said flat press face relative to the forward direction of said rotatable disc, said inclined face providing a guide passage which tapers toward said clamping space for guiding access of said clamping parts of said second components of said clamps into said clamping space.

5. An apparatus as claimed in claim 1, wherein said first and second components have outer ends where said screw receiving space is open, said clamping part of said second component being shorter than said clamping part of said first component so that said outer end of said second component terminates inwardly of said outer end of said first component.

6. An apparatus as claimed in claim 1, wherein said first and second components in each of said clamps are formed as separate pieces.

7. An apparatus as claimed in claim 6, wherein each of said clamps further has a U-shaped holding plate to hold together said connecting parts of said first and second components of each of said clamps, said U-shaped holding plate having two arm portions sandwiching said connecting parts, one of said arm portions and said connecting part of said first component being fastened to said rotatable disc, the other one of said arm portions and said connecting part of said second component being fastened together.

8. An apparatus as claimed in claim 1, wherein said first and second components of each of said clamps are formed into one piece.

9. An apparatus as claimed in claim 1, wherein said rotary cutter unit includes a pair of rotary cutters which rotate in opposite directions, one of said rotary cutters being provided downstream of the other one of said rotary cutters, said one rotary cutter being rotatable to commence cutting from an upstream side of said slot of each of the headless screws and to terminate cutting midway of said slot, said other rotary cutter being rotatable to commence cutting from a downstream side of said slot of each of the headless screws and to terminate cutting midway of said slot to complete formation of said slot.

\* \* \* \* \*